United States Patent [19]

Mukai et al.

[11] B 3,993,037
[45] Nov. 23, 1976

[54] SPARK IGNITION ENGINE HAVING COMBUSTION CHAMBER PROVIDED WITH VENT VALVE

[75] Inventors: Kosaburo Mukai, Tokyo; Motohiro Shinzawa; Seishi Yasuhara, both of Yokosuka, all of Japan

[73] Assignee: Nissan Motor Co., Ltd., Yokohama, Japan

[22] Filed: May 3, 1974

[21] Appl. No.: 466,906

[44] Published under the second Trial Voluntary Protest Program on March 16, 1976 as document No. B 466,906.

[30] Foreign Application Priority Data
May 4, 1973 Japan.................................. 48-50059

[52] U.S. Cl............................ 123/191 S; 123/30 D; 123/32 C; 123/32 B; 123/32 SP
[51] Int. Cl.²......................................... F02B 23/08
[58] Field of Search............... 123/30 C, 30 D, 32 C, 123/32 SP, 32 ST, 191 S, 191 SP, 90.6, 32 B

[56] References Cited
UNITED STATES PATENTS

| | | | |
|---|---|---|---|
| 3,205,876 | 9/1965 | Stuhr.................................. | 123/32 C |
| 3,451,213 | 6/1969 | Lang.............................. | 123/90.6 X |
| 3,763,834 | 10/1973 | Geiger et al...................... | 123/32 SP |

*Primary Examiner*—Charles J. Myhre
*Assistant Examiner*—William C. Anderson

[57] ABSTRACT

A vent valve allows a combustion chamber arranged to burn a swirling lean mixture to communicate with either an intake manifold or exhaust manifold through a vent port by-passing the intake or exhaust valve, for a short period just before ignition to discharge a fraction of the mixture from the combustion chamber. The discharge weakens the turburent flow of the mixture and results in a decreased combustion temperature, which is advantageous for suppression of NOx formation and prevention of combustion noise generation.

6 Claims, 9 Drawing Figures

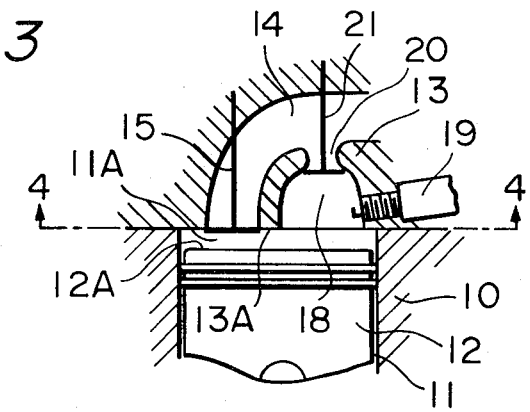
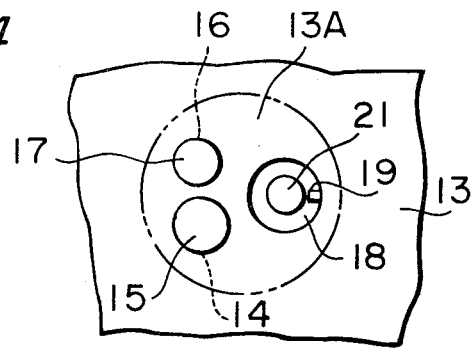
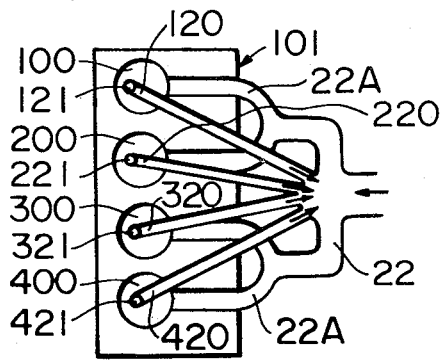
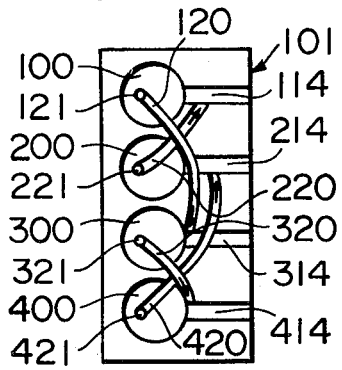

SPARK IGNITION ENGINE HAVING COMBUSTION CHAMBER PROVIDED WITH VENT VALVE

The present invention generally relates to a spark ignition internal combustion engine of the reciprocating type, and more particularly to an engine of such a type having a combustion chamber arranged to burn a lean air-fuel mixture and provided with a vent valve to keep the combustion temperature at a moderate level.

Most of conventional spark ignition internal combustion engines, especially those for automotive uses, are designed to work on a premix combustion, wherein an air-fuel mixture prepared in a carburetor is fed to the engine cylinders, or combustion chambers to be compressed and burned. The mixture is usually prepared to have an air/fuel ratio near the stoichiometric ratio to obtain satisfactory engine power with a moderate fuel consumption. As is known, combustion under such a mixture ratio proceeds at relatively high temperatures, and accordingly produces a large amount of oxides of nitrogen (NOx), which is one of major pollutants in exhaust gas.

In recent years, there is seen a marked tendency in the art to use a mixture of a high air/fuel ratio, or a lean mixture to minimize the emission of two other kinds of pollutants, namely, unburned hydrocarbons (HC) and carbon monoxide (CO). However, employment of a considerably lean air-fuel mixture presents various problems such as difficulty in ignition and increase in formation of NOx.

An engine having a combustion chamber of a unique configuration is known as a solution to these problems, which will be briefly expalined prior to detailed description of the invention.

In the accompanying drawings:

FIG. 3 is a partial longitudinal section of an engine cylinder assembly provided with a vent valve according to the invention;

FIG. 4 is a cross-sectional view taken along the line 4—4 of FIG. 3;

FIGS. 5 and 6 are diagrams illustrating variations in the arrangement of the vent valves in connection with an intake manifold;

Figure 1:
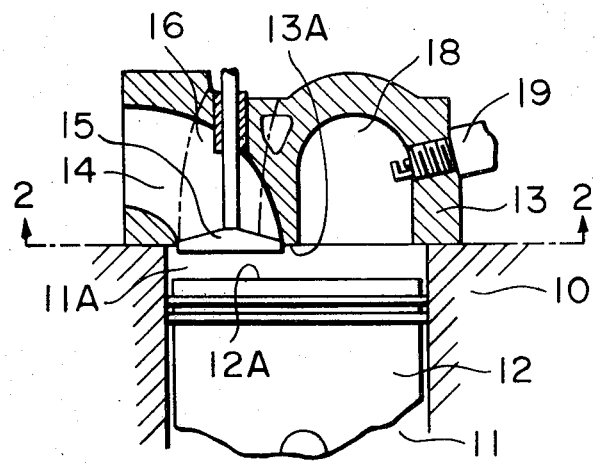
FIG. 1 is a partial longitudinal section of a prior art engine cylinder assembly.
Figure 2:
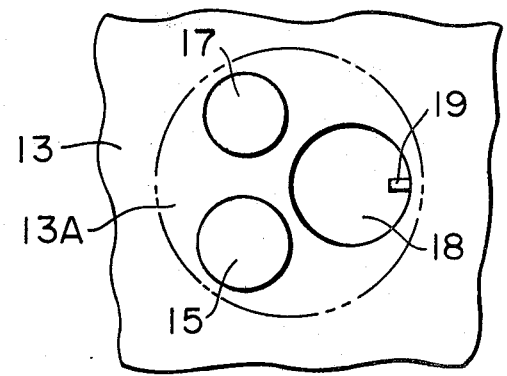
FIG. 2 is a cross-sectional view taken along the line 2—2 of FIG. 1.

A prior art engine cylinder assembly shown in FIGS. 1 and 2 includes a cylinder block 10 having a cylinder bore 11, a piston 12, a cylinder head 13 having an intake passageway 14 such as a branch of an intake manifold (not shown) leading to an intake valve 15 and an exhaust passageway 16 such as a branch of an exhaust manifold (not shown) leading to an exhaust valve 17. Both a piston-top surface 12A and a base surface 13A of the cylinder head 13 are formed flat, and the piston 12 is arranged to form a very thin chamber 11A when it comes to the top dead center. A dome-shaped recess 18 is formed in the cylinder head 13 to serve as a combustion chamber and a spark plug 19 is located to expose the ignition point thereof to the recess 18. The recess 18 is off center with respect to the longitudinal axis of the cylinder 11 and the area of the opening thereof occupies an area less than 50% of the cross-sectional area of the cylinder 11.

When the piston 12 nears the top dead center in such arrangement, a combustion mixture in the chamber 11A is extremely compressed between the opposing two flat surfaces 12A and 13A, and is violently squeezed into the recess 18. As a result of this phenomenon, which is commonly called "squish," a strong turburence or a swirling flow of the mixture occurs within the recess 18. The mixture is thoroughly blended due to the turburence, so that the fuel is intimately mixed with air, i.e., an excellent premix can be attained. A spark from the spark plug 19 to the mixture in such a state achieves a reliable ignition even when a considerably high air/fuel ratio is employed.

An intimately blended combustible mixture, however, causes an increase in burning rate and accordingly an elevated combustion temperature. As the maximum combustion temperature increases, the combustion noise becomes louder and sometimes are produced HC and/or NOx although CO is eliminated due to a large amount of air in a lean mixture.

It is therefore an object of the present invention to provide a spark ignition internal combustion engine of a reciprocating type which can work smoothly on a lean air-fuel mixture at moderate combustion temperatures so that the combustion noise and emission of pollutants can be suppressed.

According to the invention, there is provided a spark ignition internal combustion engine having:

at least one engine cylinder assembly including a cylinder, a reciprocating piston and a cylinder head;

a combustion chamber defined in the engine cylinder assembly in an arrangement to produce a turburent flow of an air-fuel mixture therein at a relatively later stage of a compression stroke; and a vent valve opening to the combustion chamber and openable at the last stage of the compression stroke and closable before ignition, whereby a fractional amount of the mixture is discharged from the combustion chamber to weaken the turburent flow.

The vent valve may communicate with either an intake passageway or an exhaust passageway of the engine cylinder assembly.

Other features and advantages of the invention will become apparent from the following detailed description taken with the accompanying drawings.

Referring now to FIGS. 3 and 4, the cylinder block 10 having the cylinder bore 11, the piston 12 in the cylinder 11 and the cylinder head 13 are assembled identically with the assembly of FIG. 1. The piston 12 is connected to a crank shaft (not shown) by means of a connecting rod (not shown) in a usual manner, and the cylinder head 13 is fixed to the cylinder block 10 also in a usual manner with an interposing gasket (not shown) to define a cylindrical chamber 11A as described before. Also the dome-shaped recess 18 is formed and arranged essentially in accordance with the described prior art. The cylindrical chamber 11A communicates with the intake passageway 14 and exhaust passageway 16 via the intake valve 15 and exhaust valve 17 seated on the flat surface 13A of the cylinder head 13, respectively. According to the present invention, a vent port 20 is formed at the bottom of the dome-shaped recess 18 to allow the recess 18 to communicate with the intake passageway 14 under the control of a vent valve 21. The vent valve 21 is opened during later stage of a compression stroke of the piston 12 usually by a cam (not shown) which is timed with respect to the position of the piston 12 and the crankshaft cycle, and is closed just before sparking of the spark plug 19, usually by springs (not shown). Therefore, a mechanism to operate the vent valve 21 may consist of a conventional valve train commonly employed for the intake valves 14.

In operation using a lean air-fuel mixture, a squish causing area is established during a compression stroke of the piston 12 as in the prior art assembly of FIG. 1 to cause a strong turburence of the mixture in the recess 18. When fuel and air are intimately mixed with each other, the vent valve 21 is opened to discharge a fractional amount of the mixture from the recess 18 into the intake port 14 through the vent port 20. Although the vent port 20 is kept open only for an extremely short period so as not to cause an excessive pressure drop in the recess 18, the turburent flow is considerably weakened by the discharge. The vent valve 21 is closed before ignition. Despite the weakened turburence, therefore, the lean mixture still remains in a well-mixed state at the instant of spark generation, so that the mixture is ignited infallibly. However, the subsequent combustion proceeds at a moderate rate, and hence lowers the maximum combustion temperature.

Preferred arrangements to return the discharged mixture to the intake passageway 14 in a multi-cylinder engine will now be presented. In a four-cylinder engine 101 of FIG. 5, four engine cylinder assemblies 100, 200, 300 and 400 are provided with vent ports 120, 220, 320 and 420, and vent valves 121, 221, 321 and 421, respectively. All the vent ports 120-420 are connected to an intake manifold 22 at a location upstream of branches 22A thereof to minimize deviation of intake pressure and/or charging efficiency. An alternative arrangement of FIG. 6 relates to the similar four-cylinder engine 101, in which the firing order is in sequence of 100–300–400–200. The vent port 120 of the cylinder 100 communicates with an intake branch 314 for the cylinder 300, which is fired following the cylinder 100. The remaining vent ports 220, 320 and 420 are similarly communicating with the intake branches 114, 414 and 214, respectively. Such arrangement contributes to improve the combustion efficiency to some degree.

Figure 7:
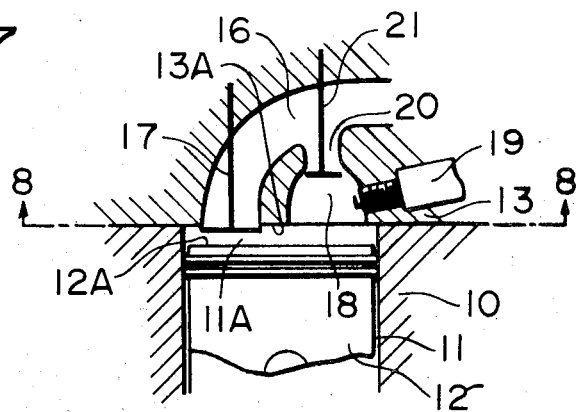
FIGS. 7 and 9 are sections similar to FIG. 3, showing variations in the arrangement of the vent valve.
Figure 8:
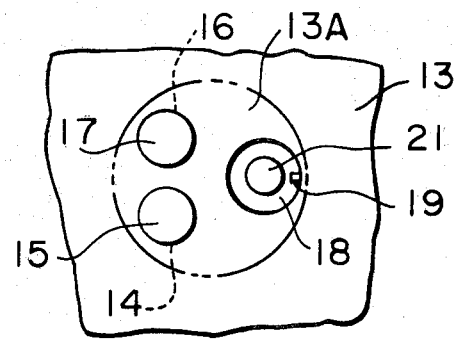
FIG. 8 is a cross-sectional view of FIG. 7.

The vent port 20 according to the invention does not necessarily communicate with the intake passageway 14. In a modified embodiment shown in FIGS. 7 and 8, general arrangement and function thereof are identical with the embodiment of FIG. 3 except that a vent port 20 communicats with the exhaust port 16. The unburned lean mixture is discharged into the exhaust passageway 16 and burns therein when mixed with the exhaust, causing HC and/or CO possibly existing in the exhaust to be oxidized.

Figure 9:
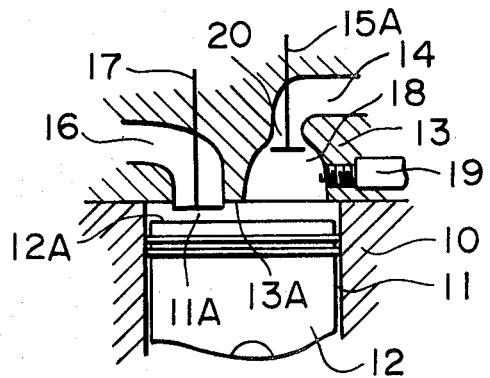

FIG. 9 shows another embodiment, in which the intake port 14 is opened to the recess 18 at the bottom thereof, not to the chamber 11A. A valve 15A seated at this location works not only as the intake valve 15 but also as the vent valve 21; i.e., the valve 15A is opened twice during a four-stroke cycle of the piston 12, once for intake and once for the fractional discharge according to the invention. It will be apparent that the same result as obtained by the preceding arrangements can be obtained also in this case.

To summarize, the fractional discharge of a combustible mixture from a combustion chamber or recess 18 just before ignition, which is the essential feature of the invention, weakens a turburence or a swirling flow of the mixture in the recess 18 and results in reduction of the subsequent combustion temperature, while an important feature of the prior art combustion chamber arrangement for a lean mixture, i.e., a thorough blending of the mixture within the dome-shaped recess 18 by a swirling flow caused by the squish can be fully maintained. As seen from the above described embodiments of the invention, discharge of a limited amount of lean mixture into either an intake system or an exhaust system has practically no unfavorable influence on normal engine operation. Thus attained moderate combustion temperature leads to suppression of NOx formation as well as prevention of combustion noise generation.

What is claimed is:

1. A spark ignition internal combustion engine, having in combination:
    at least one engine cylinder assembly including a cylinder, a reciprocating piston received in said cylinder and a cylinder head sealing said cylinder;
    a combustion chamber defined in said engine cylinder assembly in an arrangement to produce a turburent flow of an air-fuel mixture therein at a relatively later stage of a compression stroke;
    a vent valve opening to said combustion chamber and means opening said vent valve at the last portion of the compression stroke and closing said vent valve before ignition, whereby a fractional amount of the air-fuel mixture is discharged from said combustion chamber to weaken the turburent flow; said combustion chamber being formed of a cylindrical chamber defined in said cylinder between a top surface of said piston and a base surface of said cylinder head, and a dome-shaped recess formed in said cylinder head, the bottom thereof being opened and conjoined with said cylindrical chamber, a major portion of said combustion chamber being defined by said dome-shaped recess; a spark plug being arranged to expose a spark gap thereof to said dome-shaped recess, and said vent valve is opening to said dome-shaped recess; said dome-shaped recess being formed in said cylinder head off center from a longitudinal center line of said cylinder, the open end of said dome-shaped recess having an opening area smaller than 50% of the cross-sectional area of the cylinder to which the opening is conjoined; and said vent valve is located at a curved end region of said dome-shaped recess which is opposite the open end thereof.

2. A spark ignition internal combustion engine as claimed in claim 1, including in combination therewith an intake passageway leading to an intake valve of each of said at least one engine cylinder assembly, and communicating with said vent valve by-passing said intake valve.

3. A spark ignition internal combustion engine as claimed in claim 2, having a plurality of said engine cylinder assemblies, and in which said vent valve of each engine cylinder assembly communicates with said intake passageway of an engine cylinder assembly to be fired next.

4. A spark ignition internal combustion engine as claimed in claim 1, having a plurality of said engine cylinder assemblies, and including in combination therewith an intake manifold having a plurality of branches leading to intake valves of said engine cylinder assemblies, respectively, a section thereof being located upstream of said branches with respect to direction of flow therein communicating with said vent valves of all said engine cylinder assemblies.

5. A spark ignition internal combustion engine as claimed in claim 1, including in combination therewith an exhaust passageway leading from an exhaust valve of each of said at least one engine cylinder assembly and communicating with said vent valve by-passing said exhaust valve.

6. A spark ignition internal combustion engine as claimed in claim 1, including in combination therewith an intake passageway leading to said vent valve, said vent valve being openable during an intake stroke and during a predetermined short period at the last portion of a compression stroke.

* * * * *